United States Patent
Barba et al.

(10) Patent No.: US 6,981,492 B2
(45) Date of Patent: Jan. 3, 2006

(54) METHOD FOR DETERMINING AN EXHAUST GAS RECIRCULATION AMOUNT

(75) Inventors: Christian Barba, Fellbach (DE); Benjamin Müller, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 39 days.

(21) Appl. No.: 10/949,988

(22) Filed: Sep. 24, 2004

(65) Prior Publication Data

US 2005/0066947 A1    Mar. 31, 2005

(30) Foreign Application Priority Data

Sep. 26, 2003 (DE) ............................... 103 44 709

(51) Int. Cl.
*F02B 47/08* (2006.01)

(52) U.S. Cl. ............................. 123/568.15; 123/568.11
(58) Field of Classification Search ........... 123/568.11, 123/568.15, 568.22, 568.14, 568.13; 73/118.2; 701/109, 114

See application file for complete search history.

(56) References Cited

U.S. PATENT DOCUMENTS

| | | | | |
|---|---|---|---|---|
| 5,704,340 A | * | 1/1998 | Togai | 123/676 |
| 6,729,303 B2 | * | 5/2004 | Itoyama et al. | 123/478 |
| 6,840,235 B2 | * | 1/2005 | Koseki et al. | 123/568.14 |
| 6,850,831 B2 | * | 2/2005 | Buckland et al. | 701/102 |

FOREIGN PATENT DOCUMENTS

| | | |
|---|---|---|
| AT | 005 783 | 11/2002 |
| DE | 32 20 832 | 6/1990 |
| DE | 198 19 937 | 2/2000 |
| DE | 199 34 508 | 2/2000 |

* cited by examiner

*Primary Examiner*—Mahmoud Gimie
(74) *Attorney, Agent, or Firm*—Klaus J. Bach

(57) ABSTRACT

In a method for determining an exhaust gas recirculation amount for an internal combustion engine having a cylinder with an intake duct and an exhaust duct, wherein an outer exhaust recirculation amount is determined from an exhaust gas temperature, a fresh gas temperature, a fresh gas amount and an inner exhaust gas recirculation amount, and wherein the inner exhaust gas recirculation amount takes the combustion gas amount into consideration which during a charge change remains in the combustion chamber of the internal combustion engine.

5 Claims, 2 Drawing Sheets

METHOD FOR DETERMINING AN EXHAUST GAS RECIRCULATION AMOUNT

BACKGROUND OF THE INVENTION

The invention relates to a method for determining an exhaust gas recirculation amount for an internal combustion engine, particularly an internal combustion engine for a motor vehicle.

The use of exhaust gas recirculation offers advantages with regard to fuel consumption and exhaust gas emissions.

DE 199 34 508 A1 discloses a method for controlling the exhaust gas recirculation wherein a desired exhaust gas recirculation amount is determined on the basis of engine load, engine torque and air pressure, an actual exhaust gas recirculation amount and the opening and closing movement of a throttle valve are determined by sensors and an exhaust gas recirculation control valve is operated depending on the difference between the actual and the desired exhaust gas recirculation amount and a throttle valve opening signal as well as a throttle valve closing signal and the air pressure present at the time. The exhaust gas recirculation amount is determined by measuring the differential pressure in a throttle opening provided in a respective exhaust gas recirculation line.

Often, particularly in connection with Diesel engines, particle filters are provided in the exhaust duct of a motor vehicle in order to keep the exhaust gas emissions at a low level. The exhaust gas back pressure depends on the charge of the particle filter so that the exhaust gas back pressure may change significantly depending on the charge of the particle filter, which may result in disturbances in the control of the outer exhaust gas recirculation amount and cause a deterioration in the accuracy of the control.

It is the principal object of the present invention to provide a method by which the exhaust gas recirculation amount can be accurately and reliably determined under various motor operating conditions, particularly with the use of a particle filter.

The word "amount" is used mainly for simplicity reasons and comprises any physical value indicating an amount, such as the mass or the amount or mass rate for a re-circulated exhaust gas or gas mixture supplied to the engine.

SUMMARY OF THE INVENTION

In a method for determining an exhaust gas recirculation amount for an internal combustion engine having a cylinder with an intake duct and an exhaust duct, wherein an outer exhaust gas recirculation amount is determined from an exhaust gas temperature, a fresh gas temperature, a fresh gas amount and an inner exhaust gas recirculation amount, and wherein the inner exhaust gas recirculation amount takes the combustion gas amount into consideration which, during a charge change, remains in the combustion chamber of the internal combustion engine.

In accordance with the invention, the inner exhaust gas recirculation amount includes also a possible backflow of exhaust gas into the intake duct which occurs when, with a valve opening overlap, there is a pressure difference between the exhaust gas and the intake gas side such that exhaust gas flows back into the intake duct. Under certain conditions, for example, with charged air operation, the pressure drop may be reversed which results in a flushing of the combustion chamber with fresh air. Under valve overlap, the area is to be understood where inlet and outlet valves are open at the same time.

The inner exhaust gas recirculation amount is determined essentially by the internal combustion engine design and the parameters of the charge change. In a high speed charged Diesel engine for a passenger car for example, the inner exhaust gas recirculation amount is generally small because the compression machine is typically small and as a result, only little combustion gas remains in the cylinder during a charge change. This results in a low inner exhaust gas recirculation which is essentially constant over the engine operating time. Furthermore, there is only little valve overlap and little exhaust gas backflow or, respectively, little flushing.

An essential operating parameter which affects the inner exhaust gas recirculation amount is the exhaust gas back-pressure. If this back pressure changes substantially, for example, by the use of a particle filter, the inner exhaust gas recirculation amount also changes significantly.

With control methods which do not determine, and do not take into consideration, the inner exhaust gas recirculation amount, an increase of the inner exhaust gas recirculation amount (for example, by an increased exhaust gas back pressure) in an operating point without outer exhaust gas recirculation results for example in a decrease of the measured fresh gas amount. This is interpreted as an increase of the outer exhaust gas recirculation amount. Since the concept, on which the control method is based, considers only an outer exhaust gas recirculation amount between the exhaust duct and the intake duct, generally by way of a cooler, the substantially increased temperature at which the fresh gas is mixed with the inner exhaust gas recirculation amount in the cylinder is not taken into consideration with this type of control. The essentially higher temperature of the exhaust gas recirculation amount has the result that, upon mixture with the intake gas amount, the gas mass in the cylinder is reduced. With a control without consideration of the inner exhaust gas recirculation and the temperature thereof the actual exhaust gas recirculation amount is calculated too high which, upon adjustment to a desired value, results in an excessively low control value, or respectively a lower exhaust gas recirculation rate than desirable.

In order to increase the accuracy in the determination of the exhaust gas recirculation amount, the fresh gas amount and/or air requirement changes can be adapted by a comparison between the value measured during operation and the fresh gas amount determined from the pressure, temperature and fill behavior of the internal combustion engine (the so-called air need). The fresh gas amount is normally measured by means of a so-called hot film air mass meter (HFM). It may be necessary to correct the measured fresh gas amount to compensate for example for a drift of the sensor. In this way, not only the accuracy in the determination of the exhaust gas recirculation amount is increased but, at the same time, of course also the accuracy of all other functions/calculations/determinations, which depend directly or indirectly on the measured fresh gas amount. Since the adaptation process requires a deactivated exhaust gas recirculation, or at least in the respective adaptation point a constant, small exhaust gas recirculation amount, an inner exhaust gas recirculation, which is not negligible but not taken into consideration, results in incorrect measurement values or respectively in faulty actualizations or, respectively adaptations.

With the method according to the invention, the inner as well as the outer exhaust gas recirculation amounts are taken into consideration. The exhaust gas recirculation amount calculated in this way is highly accurate under stationary, non-stationary and differing ambient conditions. A high control accuracy can be achieved. Furthermore, also the fresh gas amount inducted is determined with greater accuracy and can be corrected by a comparison with calculated values. The method according to the invention is preferably implemented with a control apparatus provided for the internal combustion engine.

Various embodiments of the invention will be described below in greater detail on the basis of the accompanying drawings.

DESCRIPTION OF PARTICULAR EMBODIMENTS

Figure 1:
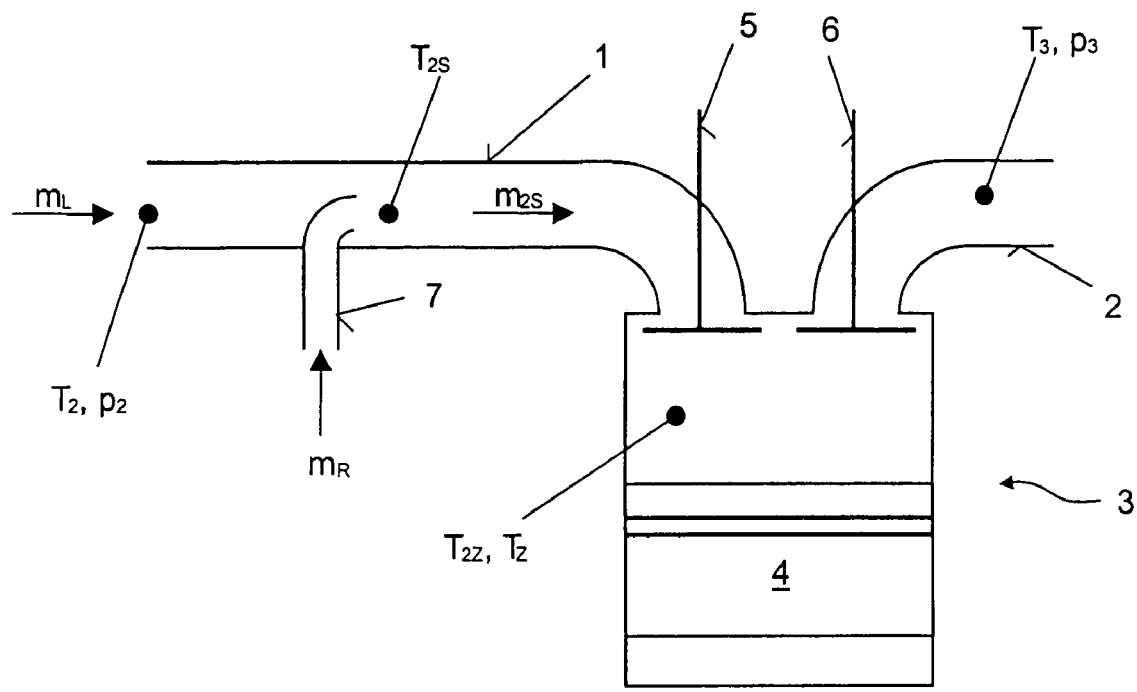
FIG. 1 shows schematically a cylinder of an internal combustion engine with an intake duct and an exhaust duct.

In the figures functionally identical parts or values are indicated by the same reference numerals.

FIG. 1 shows schematically, an exemplary cylinder 3 of an internal combustion engine with an intake duct 1 and an exhaust duct 2, in connection with which the method according to the invention may be used for controlling the exhaust gas recirculation amount. An exhaust gas recirculation pipe 7 is provided by which the exhaust duct 2 and the intake duct 1 are interconnected and through which exhaust gas is supplied from the exhaust duct 2 to the intake duct 1. The exhaust gas recirculation pipe 7 preferably is provided with a cooler which is not shown, and a control device, preferably a throttle valve (also not shown), is also arranged in the exhaust gas recirculation pipe 7. The cylinder 3 includes a piston 4, an intake valve 5 and an exhaust valve 6.

By way of the intake duct 1, a gas amount $m_{2S}$ is supplied to the cylinder which is composed of the fresh gas amount $m_L$ and a recirculated gas amount $m_R$. The fresh gas amount $m_L$ is determined for the method according to the invention by means of a sensor which is not shown, that is, for example, a hot film air mass sensor. In the exhaust duct 2, there are an exhaust gas back pressure $P_3$, which is measured preferably by a corresponding sensor (not shown) and an exhaust gas temperature $T_3$. The exhaust gas temperature $T_3$ is determined preferably by a corresponding performance graph or, respectively, a simulation model from the fuel amount supplied to the cylinder 3 or, respectively, the internal combustion engine and the rotational speed of the engine. In the intake duct 1 upstream of the exhaust gas recirculation line 7, there is a charge pressure $p_2$ and a temperature $T_2$ which are determined by appropriate sensors, which are not shown. Immediately after admixture of the exhaust gas recirculation amount ma the temperature in the intake pipe is $T_{2s}$ which can be determined by measuring and/or computation. In the cylinder 3, there is ahead of the admixture and without consideration of the inner gas recirculation amount a temperature $T_{2z}$. After admixture or respectively considering the inner gas recirculation amount, the temperature in the cylinder 3 is $T_z$.

The inner exhaust gas recirculation amount takes into consideration the exhaust gas amount $m_{RiOT}$, which remains in the combustion chamber of a cylinder of the internal combustion engine with the piston in the top dead center position. Assuming that during a charge change the combustion chamber is still filled in the top dead center position of the piston with residual gas which has at least approximately the exhaust gas temperature $T_3$ and whose pressure corresponds to the exhaust gas back pressure $p_3$, by means of the thermal state equation the combustion gas amount $m_{RiOT}$ remaining in the cylinder can be described as follows:

$$M_{RiOT} = \frac{p_3 \cdot V_c}{R \cdot T_3}. \tag{1}$$

wherein R is the universal gas constant and $V_c$ is the compression volume.

In addition, a possible backflow of combustion gases into the intake duct during opening of the intake valve may be taken into consideration if the pressure $p_3$ in the exhaust duct exceeds the pressure $p_2$ in the intake duct. This back flow $_{RiR}$ may be described on the basis of the so-called Saint-Venant flow equation as follows:

$$m_{RiR} = A \cdot \frac{1}{n \cdot 60} \cdot \frac{P_3}{\sqrt{R \cdot T_3}} \cdot \sqrt{\frac{2 \cdot K}{K-1}\left[\left(\frac{P_3}{P_2}\right)^{2/K} - \left(\frac{P_3}{P_2}\right)^{K+1/K}\right]} \tag{2}$$

wherein n=the engine speed, A=the momentarily effective value opening cross-section or, respectively, empirically determined valve overlap with respect to time and cross-section and K=the isentropic exponent. To what extent the back flow $m_{RiR}$ should be taken into consideration depends on the application or, respectively, the system used. If the valve overlap is very short as it is for example in supercharged Diesel engines with high compression ratios or respectively, a large charge, the backflow $m_{RiR}$ can be neglected, in particular at high engine speeds.

The total inner exhaust gas recirculation amount $m_{Ri}$ is determined from the exhaust gas amount $m_{RiOT}$ remaining in the combustion chamber of a cylinder during a charge change and the combustion gas amount $m_{RiR}$ flowing back into the intake duct according to the following equation:

$$m_{Ri} = m_{RiR} + m_{RiOT} \tag{3}$$

With a neglection of the back flow $m_{RiR}$ the equation (3) is simplified to:

$$m_{Ri} = m_{RiOT} \tag{4}$$

The inner exhaust gas recirculation results in the cylinder in a heating of the complete charge and, consequently, with increasing inner exhaust gas recirculation, in a lowering of the total gas mass in the cylinder. In order to consider this decrease of gas mass in the cylinder because of the higher temperature of the exhaust gas recirculation amount, with controls, adaptations and/or models or simulations, preferably an idealized inner exhaust gas recirculation amount is formed which is based on the assumption of constant temperature conditions and which will be called below "apparent inner exhaust gas recirculation amount".

Figure 2:
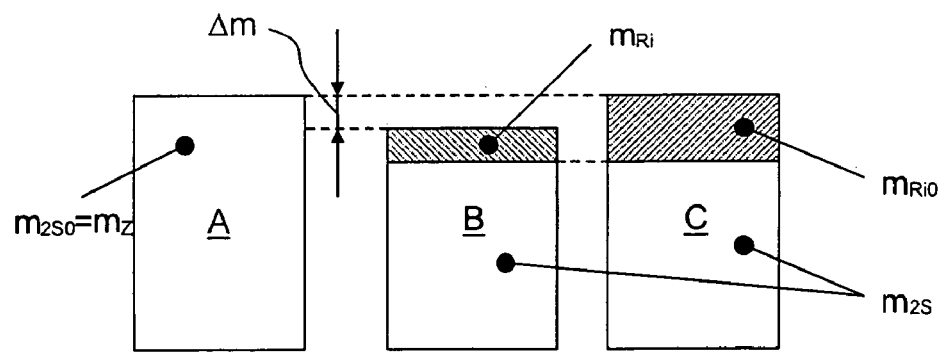
FIG. 2 shows schematically the intake gas volume and the inner exhaust gas recirculation amount.

FIG. 2 is a schematic representation of the amount ratios in a cylinder combustion chamber. The column A represents the ideal conditions without consideration of the inner exhaust gas recirculation. In this case, the cylinder amount $m_2$ corresponds to the inducted gas amount $m_{2S0}$. The column B shows the actual conditions where the inner gas recirculation is taken into consideration wherein the gas amount in the cylinder consists of the inducted gas amount $m_{2S1}$ comprising the inducted fresh air amount and the exhaust gas amount of the outer exhaust gas recirculation and the inner exhaust gas recirculation amount $m_{Ri}$. The amount of difference $\Delta_m$ corresponds to the reduction of the cylinder amount $m_2$ resulting from the heating by the inner exhaust gas recirculation $m_{Ri}$. The column C shows the conditions under the assumption that there is an inner exhaust gas recirculation but the cylinder charge is not heated thereby. The whole gas amount in the cylinder accordingly corresponds to the gas amount of the column A and it is composed of the inducted gas amount $m_{25}$ and an apparent inner exhaust gas recirculation amount $m_{RiO}$, which would fit additionally into the cylinder if the cylinder charge would not be heated by the higher temperature exhaust gas. The apparent inner exhaust gas recirculation amount $m_{RiO}$ is obtained as the sum of the actual inner exhaust gas recirculation amount $m_{RiO}$ and the amount difference $\Delta m$. The apparent inducted gas amount $m_{250}$ corresponds to the sum of the actual inducted gas amount $m_{25}$ and the apparent inner exhaust gas recirculation amount $m_{RiO}$.

Assuming that the gas amount inducted is heated upon flowing into the cylinder from the temperature $T_{25}$ in the intake duct to the temperature $T_{22}$ in the cylinder and this temperature increase is known, for the case that there is no inner exhaust gas recirculation, that is the apparent gas amount $m_{RiO}$ sucked in corresponds to the gas amount $m_{25}$ actually taken in, the thermal state equation in the lower dead center position of the piston can be formulated as follows:

$$\frac{p_{2z} \cdot (V_c + V_H)}{R} = m_2 \cdot T_{22} = m_{250} \cdot T_{2z} = m_{25} \cdot T2z, \quad (5)$$

wherein the pressure $p_{2z}$ is to correspond to the pressure which exists in the cylinder at the lower dead center position of the piston that is at the end of the intake stroke. The variable $V_c$ represents the compression volume and the variable $V_M$ represents the displacement volume. The gas amount $m_2$ present in the cylinder corresponds in this case to the inducted gas amount $m_{251}$, which, without inner exhaust gas recirculation, corresponds to the apparent intake gas amount $m_{250}$.

If the inner exhaust gas recirculation is taken into consideration and it is further assumed that the inducted gas amount $m_{25}$ is heated by the induction procedure, but not by mixture with the inner exhaust gas recirculation amount, to the temperature $T_{2z}$ and that the exhaust gas recirculation amount $m_{Ri}$ of a temperature $T_3$ is admixed, the thermal state equation can be formulated as follows:

$$\frac{p_{2z} \cdot (V_c + V_H)}{R} = \quad (6)$$
$$m_2 \cdot T_{22} = m_{250} \cdot T_{2z} = (m_{RiO} + m_{25}) \cdot T_{2z} = m_{Ri} \cdot T_3 + m_{25} \cdot T_{2z},$$

wherein $m_{25}) = m_{RiO} + m_{25}$ as described above.

From the equation (6) the apparent exhaust gas recirculation amount $m_{RiO}$ is as follows:

$$m_{RiO} = \frac{T_2 \times m_{Ri}}{T_{2z}} \quad (7)$$

The temperature $T_{2z}$ which is present in the cylinder can be measured by an appropriate sensor. If no sensor is present for example for cost reasons or space considerations the temperature can be determined from an already known condition value by means of observation and/or by way of a suitable performance graph or model.

Preferably, the temperature $T_{2z}$ is determined by way of the measured and/or calculated temperature $T_{25}$ which is present in the intake duct after admixture of the outer exhaust gas recirculation amount with an additive correction depending on the engine speed n and the fuel injection quantity q. The temperature present in the cylinder is then:

$$T_{2z} = T_{2s} + f(n,q) \quad (8)$$

wherein $f(n,q)$ is a function of the engine speed n and the fuel injection quantity q which can be determined empirically for example by corresponding tests and/or by physical modeling and/or system identification (for example, by means of the method of the smallest error squares).

With the method according to the invention, an outer exhaust gas recirculation amount is determined on the basis of the exhaust gas temperature $T_3$, the fresh gas temperature $T_2$, the inducted fresh gas amount $m_2$ and the inner exhaust gas recirculation amount $m_{Ri}$, which is preferably based on the determination of the apparent inner exhaust gas recirculation amount $m_{RiO}$ as defined above. This has the advantage that the temperature difference between the inducted gas amount and the inner exhaust gas recirculation amount can be taken into consideration for the determination and consequently the control of the outer exhaust gas recirculation amount. The preferably apparent—inner exhaust gas recirculation amount $m_{Ri}$, or respectively, $m_{RiO}$ is preferably taken into consideration in such a way that it is added with the determination of the outer exhaust gas recirculation amount to the inducted fresh gas amount $m_1$, which is determined by measuring, forming a so-called apparent inducted fresh gas amount $m_{2e}$ as follows:

$$M_{Lo} = m_{RiO} + m_L \quad (9)$$

For a control of the outer exhaust gas recirculation amount the calculated inner exhaust gas recirculation amount is added to the calculated outer exhaust gas recirculation amount.

If further, particularly for increasing the accuracy of the calculation of the outer exhaust gas recirculation amount,or, respectively, for the correction of the measured fresh gas amount, an adaptive function or, respectively, a learn function is initialized which actualized or, respectively, corrects the inducted fresh gas amount, or respectively, the air use during operation of the process system, preferably also, with this actualization, the inner exhaust gas recirculation amount is taken into consideration. The fresh gas amount or respectively the air use is corrected or actualized preferably not only on the basis of the measured fresh gas amount $m_L$, but the apparent fresh gas amount $m_{LO}$ is calculated in accordance with the equation (9).

Figure 3:
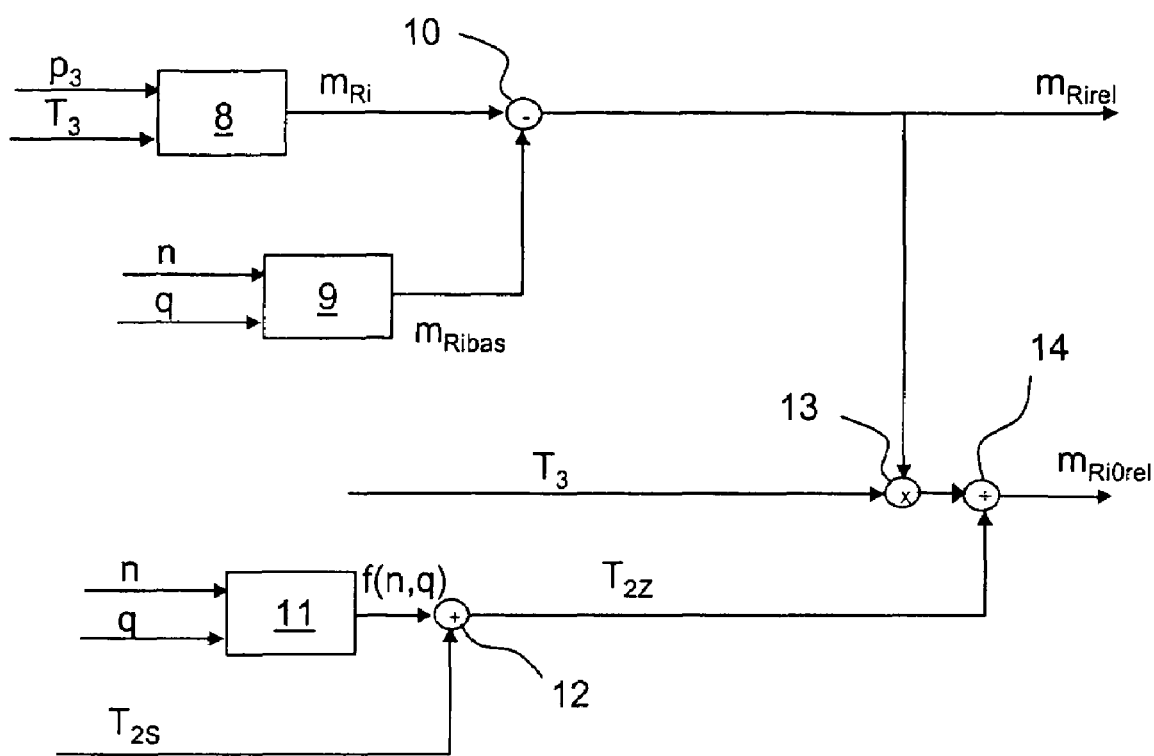
FIG. 3 shows a block diagram for determining the inner exhaust gas recirculation amount.

Based on the equations (1) to (8) the actual inner exhaust gas recirculation amount and the apparent inner exhaust gas recirculation amount are calculated, preferably as schematically shown in the block diagram of FIG. 3. For simplicity reasons, the backflow into the intake duct is disregarded in the calculation (see equation 2). This means that the inner exhaust gas recirculation amount is obtained in accordance with equation (4). The backflow may of course also be taken into consideration by way of a corresponding performance graph or model, which represents the calculation of equation (2).

Preferably, the calculation of the inner exhaust gas recirculation amount or, respectively, the apparent inner exhaust gas recirculation amount is relative. This means that the change of the inner exhaust gas recirculation amount or, respectively, the apparent inner exhaust gas recirculation amount with changing exhaust gas back pressure $p_3$ is calculated. The change of the inner exhaust gas recirculation amount will be called below the relative inner exhaust gas recirculation amount $m_{Ri\ rel}$. The change of the apparent inner exhaust gas recirculation amount will be called the relative apparent inner exhaust gas recirculation amount $m_{RiOrel}$. With small changes of the exhaust gas backpressure particularly for an operation without particle filter, in this way, only a simple application with little calculation requirements is possible.

In FIG. 3, the function block 8 represents a performance graph or a model which, in accordance with the equation (1) calculates from the input values, momentary exhaust gas back pressure $p_3$ and momentary exhaust gas temperature $T_3$, an absolute inner exhaust gas recirculation amount $m_{Ri}$. From the momentary engine speed n and the momentary fuel injection quantity q, a basis value $m_{Ribas}$ for the inner exhaust gas recirculation is formed by means of the function block 9 which represents a characteristic performance graph or a corresponding model. The basis value $m_{Ribas}$ corresponds preferably to an inner exhaust gas recirculation amount as it occurs with an application without particle filter or, respectively, with a slightly clogged or clean particle filter. At a junction point 10, the basis value $m_{Ribas}$ for the inner exhaust gas recirculation amount is subtracted from the absolute inner exhaust gas recirculation amount $m_{Ri}$ while forming the relative inner exhaust gas recirculation amount $m_{Rirel}$.

In accordance with the equation (7) and (8), the relative apparent inner exhaust gas recirculation amount $m_{RiOrel}$ is formed. By means of the function block 11, which represents a performance graph or a corresponding model, the value f(n,q) is calculated from the momentary engine greed n and the momentary fuel injection quantity q. The value is added in a junction point 12 to the temperature $T_{2s}$ for the formation of the temperature $T_{2z}$ present in the cylinder. The temperature $T_{2z}$ present in the intake duct can be determined by measuring and/or calculation. The relative inner exhaust gas recirculation amount $m_{Rirel}$ is multiplied in a junction point 13 by the exhaust gas temperature $T_3$ and divided in a junction point 14 by the cylinder temperature $T_{2z}$ thereby forming the relative apparent inner exhaust gas recirculation amount $m_{RiOrel}$.

If in the calculation also the backflow $m_{RiR}$ is to be taken into consideration, this can be accomplished by way of a function block corresponding to the function block 8, which is based on the equation (2) and whose output is taken into consideration additively and with respect to the signal flow ahead of the junction point 10 for the forming of the relative inner exhaust gas recirculation amount. The function block 9 should be adapted correspondingly under these conditions.

The block diagram shown in FIG. 3 may of course be simplified in that absolute instead of relative values are calculated. Then the subtraction of the basis value $m_{Ribas}$ would have to be omitted.

The structure for the calculation of the inner exhaust gas recirculation amount or, respectively the apparent inner exhaust gas recirculation amount as shown in FIG. 3 is realized preferably by software in a control computer of the internal combustion engine.

What is claimed is:

1. A method for determining an exhaust gas recirculation amount for an internal combustion engine, having a cylinder (3) with an intake duct (1) and an exhaust duct (2), comprising the steps of: determining an outer exhaust gas recirculation amount from an exhaust gas temperature ($T_3$), a fresh gas amount ($m_2$) and an inner exhaust gas recirculation amount ($m_{Ri}$, $m_{RiO}$), said inner exhaust gas recirculation amount ($m_{Ri}$, $m_{RiO}$) taking into account the combustion gas amount ($m_{Rio7}$) which remains in the cylinder (3) of the internal combustion engine during a charge change.

2. A method according to claim 1, wherein the inner exhaust gas recirculation amount ($m_{Ri}$, $m_{RiO}$) additionally takes the combustion gas amount ($m_{RiR}$) into consideration which flows back into the intake duct (1) during valve overlap.

3. A method according to claim 1, wherein an idealized, that is, an apparent inner exhaust gas recirculation amount ($m_{RiO}$), is used for the determination of the outer exhaust gas recirculation amount, said apparent exhaust gas recirculation amount ($m_{RiO}$) being formed by the inner exhaust gas recirculation amount ($m_{Ri}$) taking into consideration the ratio of exhaust gas temperature ($T_3$) and a cylinder temperature ($T_{2z}$) before admixture of the inner exhaust gas recirculation amount ($m_{Ri}$).

4. A method according to claim 3, wherein the cylinder temperature ($T_{2z}$) is determined before the admixture of the inner exhaust gas recirculation amount ($m_{Ri}$) depending on the engine speed (n) and a fuel injection quantity (q) from a temperature ($T_{2s}$) in the intake duct (1) after admixture of the outer exhaust gas recirculation amount.

5. A method for determining a fresh gas amount for supply to an internal combustion engine, comprising the steps of measuring a fresh gas amount ($m_L$) supplied to the internal combustion engine, correcting the measured fresh as amount taking into consideration an inner exhaust gas recirculation amount ($m_{Ri}$, $m_{RiO}$) comprising a combustion gas amount remaining in the internal combustion engine during a charge change, and determining therefrom an apparent fresh gas amount ($m_{Lo}$).

* * * * *